United States Patent [19]

Rodriguez

[11] Patent Number: 5,027,551
[45] Date of Patent: Jul. 2, 1991

[54] DECORATIVE LAWN EDGING PACKAGE

[76] Inventor: Lazaro E. Rodriguez, 3300 NW. 48th St., Miami, Fla. 33142

[21] Appl. No.: 486,596

[22] Filed: Feb. 28, 1990

[51] Int. Cl.⁵ .............................................. A01G 1/00
[52] U.S. Cl. ........................................ 47/33; 52/102
[58] Field of Search ................. 47/33, 32, 24; 256/19, 256/24; 52/102, 582; 404/6, 7, 8; 411/912, 477, 478

[56] References Cited

U.S. PATENT DOCUMENTS

| | | |
|---|---|---|
| D. 276,494 | 11/1984 | Novak et al. ............................ 47/33 |
| 412,696 | 10/1889 | Berry . |
| 553,886 | 2/1896 | Wyland . |
| 1,039,478 | 9/1912 | Barnes . |
| 1,965,883 | 7/1934 | Cotton . |
| 1,977,080 | 10/1934 | Newton . |
| 2,035,817 | 3/1936 | Lloyd . |
| 2,050,010 | 8/1936 | McChesney . |
| 2,094,519 | 9/1937 | Ballard . |
| 2,273,508 | 2/1942 | Beegle ................................. 411/478 |
| 2,482,405 | 9/1949 | Edlund ................................. 52/582 |
| 2,746,723 | 5/1956 | Freeman . |
| 3,032,767 | 5/1962 | Weiss et al. . |
| 3,198,057 | 8/1965 | Moore . |
| 3,892,387 | 7/1975 | Mann . |
| 4,543,645 | 10/1985 | Beck . |
| 4,543,745 | 10/1985 | Beck ................................. 47/33 |
| 4,747,231 | 5/1988 | LeMay et al. ...................... 47/33 |

FOREIGN PATENT DOCUMENTS 460051 3/1939 United Kingdom .

Primary Examiner—Richard E. Chilcot, Jr.
Assistant Examiner—Michele A. Van Patten
Attorney, Agent, or Firm—Malloy, Downey & Malloy

[57] ABSTRACT

A decorative lawn edging that includes several units or segments that are contiguously disposed and held together by a connecting corrugated band that is inserted on one of the ends of the units along their diameters. The band is sufficiently flexible to permit the units to follow a curved path without appreciable separation between the units.

3 Claims, 2 Drawing Sheets

DECORATIVE LAWN EDGING PACKAGE

BACKGROUND OF THE INVENTION

1. Field of the Invention

The present invention relates to a decorative lawn edging package and a process for making the same and more particularly, to a lawn edging strip that includes a plurality of contiguous segments or units that are joined together by an elongated corrugated galvanized steel band member.

2. Description of the Related Art

The typical decorative lawn edging consists of a plurality of segments or units, usually of uniform dimensions, that are connected together by means of a flat band that is fastened to the side of the aforementioned units. Consequently, this band is seen from either the front or the back thereby detracting from the aesthetics of the lawn edging. Also, another drawback of the conventional lawn edging is that if it is forced to follow a curved path, the units will tend to separate on the convex or outer side of the edging leaving openings that permit the viewing of the supporting band. Finally, since the supporting band cannot be on the outer or convex side, an S-shaped path would be difficult to create if not impossible.

Another type of decorative lawn edging presently in use involves the creation of an incision on the lower end of the units through which a metallic band is passed and held in place by either nails radially crossing the units and band or staples placed on the bottom surface of the units and over the incision. This type of edging, however, requires additional labor and components and the final arrangement of parts lacks the structural integrity of the present invention.

Applicant believes that the closest reference corresponds to U.S. Pat. No. 4,543,745 issued to Beck. However, it differs from the present invention because the sheet of metal 52 is fastened to the back of the timber members whereas here nothing shows and the contiguous units are more flexible in following a predetermined path.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a decorative lawn edging that can conform to either convex or concave curvatures without causing a separation of its units. In other words, the log segments are held together in a strip which is bendable longitudinally in two directions.

It is another object of this present invention to provide a decorative lawn edging where its supporting element is hidden.

It is yet another object of the present invention to provide such a device that is inexpensive to manufacture and maintain while retaining its effectiveness.

It is another object of this invention to provide a lawn edging package and a process for making the same.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENTS

Figure 1:
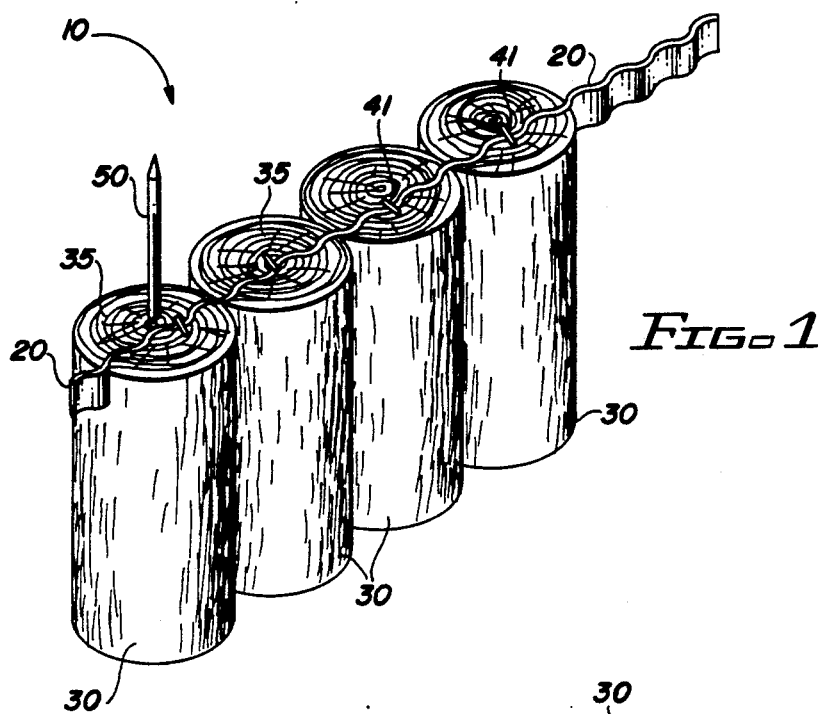
FIG. 1 represents the present invention upside down using uniform units of circular cross-section.

Referring now to FIG. 1, a portion of a log segment edging strip is generally referred to by the numeral 10. It can be observed that it includes a plurality of units or log segments 30 which are preferably made out of wood and of generally uniform cylindrical shape, each segment preferably being of a substantially common height and diameter. A corrugated band 20, preferably of galvanized steel, is inserted along the approximate diameter centers of the ends 35 of the units 30 holding them together. Units 30 may be of a variety of sizes and shapes, as it can be seen from FIG. 2. Band 20 is longitudinally flexible to allow the units to conform to a curved path without creating a separation between the units, as it can be seen in FIG. 3. Band 20, however, is rigid enough along its width dimension to penetrate through one of the ends of units 30. Band 20 is, preferably, made out of steel or galvanized steel 26 gauge (approx. 0.020 of an inch thick), and the ends of the log segments are forced onto the band edge. The log segments are preferably pressure treated by a wood preservative selected from the class which includes creosote, chromated copper arsenate and penta chloro phenal.

Also, since the band is inserted through the end that is on the ground, it is not seen. This is specially important when the band used is exposed to the elements over a considerable period of time and deteriorates, thereby detracting from the intended aesthetical appeal of the lawn edging.

Another advantage of the present invention is that if one of the units needs to be replaced, it can be simply hammered out of and/or on band 20 easily.

An anchorage pin 50 is usually nailed on the bottom surface 35 of the end unit to provide an anchorage point and prevent movement of the edging assembly.

Figure 3:
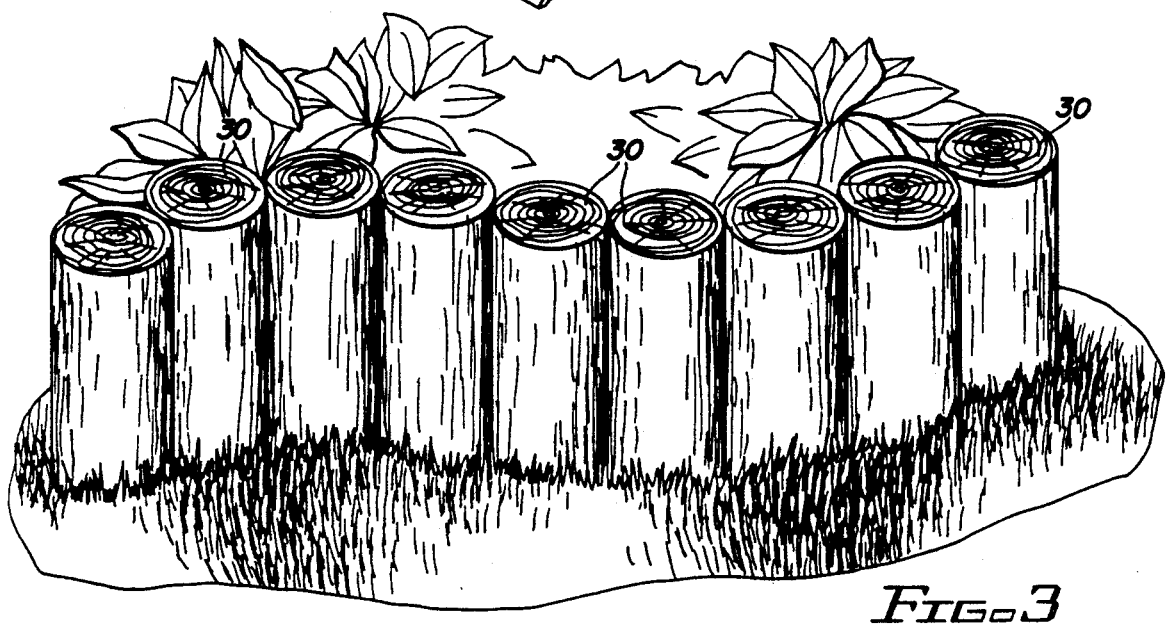
FIG. 3 is the present invention disposed on a curved path that forms a convex side and a concave side.

In arranging edging 10, it can be made to conform to curved paths without creating openings between units 30. The curved paths can be on one side or the other since metal band 20 is positioned on the diameter centers, as seen in FIG. 3.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

Figure 4:
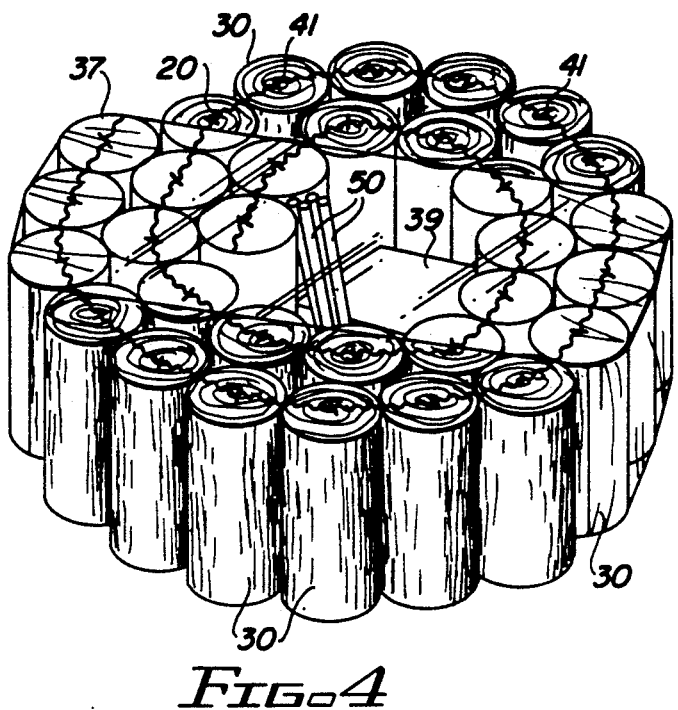
FIG. 4 is a perspective view of a package composed of a strip of lawn edging.
Figure 5:
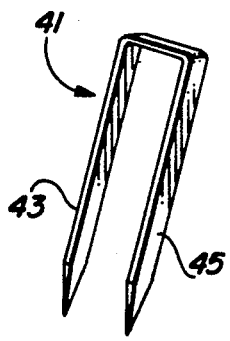
FIG. 5 is a perspective view of a staple used in the invention.

As seen in FIG. 4, strips of log segment packages preferably between three foot and ten foot in length are formed by rolling the strip into a coilform for shipping the same after it is banded together by a transparent plastic wrap 36 which captivates the free end 37 and defines an interior pocket in which an instruction sheet as well as a plurality of spikes 50 for anchorage are also captivated. The package generally is of a diameter of between about fifteen inches and twenty-four inches.

Figure 6:
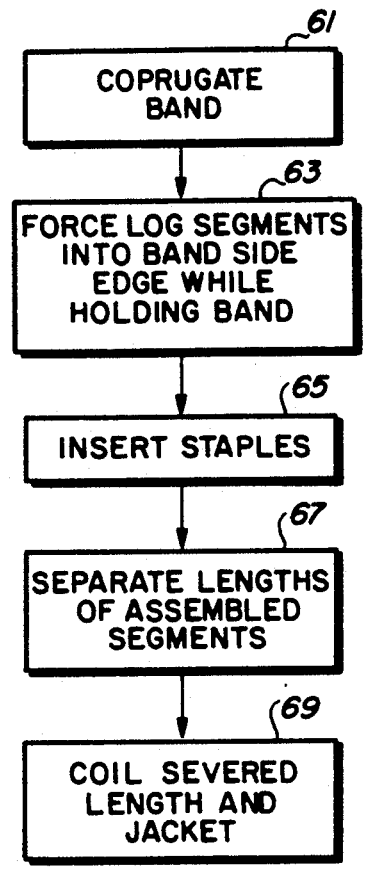
FIG. 6 is a schematic view of the process for making the log segment package.

The process of making the strips includes the steps of first corrugating a galvanized steel band and while holding the band on its edge, forcing the lower end of the log segments onto the band edge which penetrates along a generally diametrical line of each segment without splitting the end. Thereafter, a staple is driven into each log end and the lengths are separated from the assembled strip by cutting between a pair of adjacent log segments. Thereafter, the severed length is rolled into a coilform as seen in FIG. 4 and banded by a plastic retaining means snugly jacketing the main portion and captivating the free end of the length. The steps of the process are generally designated in FIG. 6 with the numerals 61, 63, 65, 67 and 69 corresponding to the steps described above.

Figure 2:
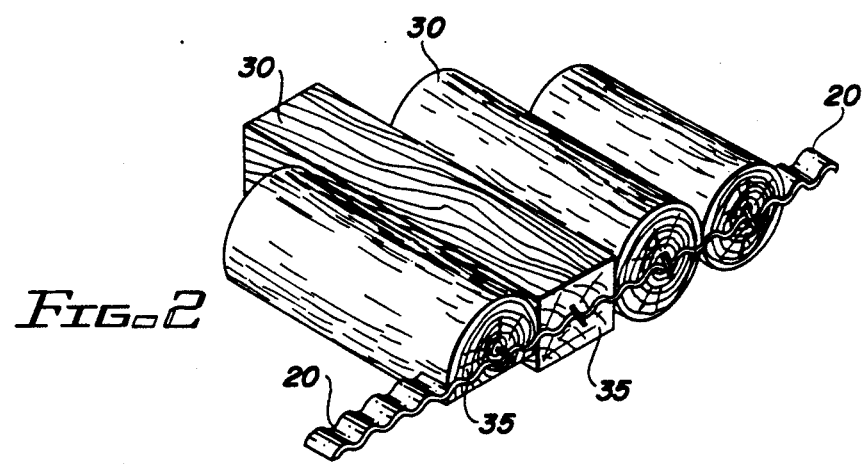
FIG. 2 shows the present invention using units of different shapes and dimensions.

Preferably the log segments are cylindrical and are at least four inches in height and of a generally common diameter between two inches and four inches; however, if desired different shapes may be utilized as seen in FIG. 2. In assembly, the segments abut on another. The steel band is between three-quarter inches and one and one-quarter inches in height and of a gauge between twenty-four and twenty-eight. Preferably a U-shaped staple 41 is driven into the lower log ends with the legs penetrating the ends on opposite sides of the band. The legs being between one inch and one and one-half inches in length and being separated from one another by about one-quarter inch to three-eights inch. The log segments are thus securely held together in package form for shipment and when being installed and the strip is bendable in either direction and securely held together with ends that are not split.

It is thus seen that there has been provided a lawn edging package of pressure treated log segments which may be installed on the surface of a lawn by placing the strip upright on a hard surface and using the spikes provided, hammering them in as needed or additionally, digging a furrow in the ground about one inch deep around the area which is to be edged and inserting the spikes where needed and then installing the strip and building up dirt around both sides of the edging strip. The edging strip may be bent in either direction to fit any configuration. If a component is broken while inserting the nails, one simply pulls out the broken component and pushes the edging strip together at the point where the missing component was located.

What is claimed is:

1. A log edging comprising a strip between three foot and ten foot in length comprising abutting wooden log segments, each segment being pressure treated with a wood preservative and having an upper end and a lower end, the lower ends of each segment being in a generally common plane and all of the segments being at least four inches in height and between four inches and twelve inches in height, each segment being generally cylindrical and of a generally common diameter of between two and four inches, each segment abutting an adjacent segment,
   a corrugated galvanized steel band having an upper side edge and a lower side edge between three-quarter inches and one and one-quarter inches in height and being of a gauge of between twenty-four and twenty-eight, said band being embedded in the lower ends and said band extending of the segments of the strip generally diametrically across the lower end of each segment, and
   a generally U-shaped staple embedded in the lower end of each of the segments, each staple having a first leg and a second leg of generally common length and between one and one-half inches in length and said legs being about one-quarter inch to three-eighths of an inch apart and being sixteen gauge staples, one staple leg being on one side of said lower edge of said band and the other staple being on the other side of said lower edge.

2. A strip as set forth in claim 1 wherein said strip is rolled upon itself to form a coil of between fifteen inches and twenty-four inches in diameter, and
   a retainer means comprising a wrap of plastic snugly jackets the coil and maintains said strip in package form for shipping.

3. A strip in package form for shipping as set forth in claim 2 including a plurality of spikes in said package form overlaying the lower ends of the said log segments.

* * * * *